(12) United States Patent
Dimitrov et al.

(10) Patent No.: US 6,671,117 B2
(45) Date of Patent: Dec. 30, 2003

(54) MAGNETIC WRITER FOR NOISE SUPPRESSION IN PERPENDICULAR RECORDING MEDIA

(75) Inventors: Dimitar V. Dimitrov, Edina, MN (US); Johannes VanEk, Minnetonka, MN (US); Michael C. Kautzky, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 160 days.

(21) Appl. No.: 09/957,406

(22) Filed: Sep. 20, 2001

(65) Prior Publication Data

US 2002/0075586 A1 Jun. 20, 2002

Related U.S. Application Data

(60) Provisional application No. 60/257,128, filed on Dec. 20, 2000.

(51) Int. Cl.[7] .................................................. G11B 5/02
(52) U.S. Cl. ............................................. 360/57; 360/55
(58) Field of Search .......................... 360/66, 57, 122, 360/55, 125

(56) References Cited

U.S. PATENT DOCUMENTS

| 5,616,218 A | | 4/1997 | Alex ..................... 204/192.15 |
| 5,815,342 A | * | 9/1998 | Akiyama et al. ........ 360/97.01 |
| 6,531,202 B1 | * | 3/2003 | Litvinov et al. ........... 428/65.3 |
| 6,574,072 B1 | * | 6/2003 | Batra ......................... 360/125 |
| 2002/0028355 A1 | * | 3/2002 | Nakamura et al. ... 428/694 TM |

* cited by examiner

Primary Examiner—David Hudspeth
Assistant Examiner—Rocio Colon
(74) Attorney, Agent, or Firm—Westman, Champlin & Kelly, P.A.

(57) ABSTRACT

A transducing head for perpendicularly writing data to a magnetic medium having a recording layer and a soft magnetic underlayer comprises a perpendicular write transducer for writing data into the recording layer and a DC magnetic writer having legs in spaced relation to generate a magnetic field along tracks of the magnetic medium. The magnetic field writes a DC magnetic effect longitudinally into the soft magnetic underlayer, thereby reducing noise due to the operation of the perpendicular write transducer.

20 Claims, 10 Drawing Sheets

MAGNETIC WRITER FOR NOISE SUPPRESSION IN PERPENDICULAR RECORDING MEDIA

CROSS-REFERENCE TO RELATED APPLICATION

This application claims priority of U.S. Provisional Application No. 60/257,128 filed Dec. 20, 2000 for "A Permanent Magnet Writer for Noise Suppression in Dual-Layer Perpendicular Recording Media".

FIELD OF THE INVENTION

This invention relates to perpendicular magnetic recording, and particularly to reduction of noise in the recording to improve signal-to-noise ratio during read operations.

BACKGROUND OF THE INVENTION

Perpendicular recording is a form of magnetic recording in which the magnetic flux of recorded data are oriented perpendicularly to the surface recording medium, as opposed to longitudinally along a track of the medium as in traditional longitudinal recording. Perpendicular recording offers advantages over longitudinal recording which may be important to extend disc drive technology beyond data densities of 100 gigabytes per square inch. Two of the important advantages of perpendicular recording over longitudinal recording are (1) the ability to achieve significantly higher linear densities and (2) larger writing fields. Higher linear densities are achieved because the demagnetization energy in the magnetic transitions in perpendicular media supports the recorded transitions, as opposed to deteriorating the transitions as in longitudinal recordings. Larger writing fields are a result of the use of a soft magnetic underlayer beneath the hard recording layer of the medium.

However, the soft magnetic underlayer often generates noise during playback which can be detrimental to the implementation of perpendicular recording in disc drives. Computer models of the flux patterns of perpendicular recording shows that even if flux in the soft underlayer is perfectly aligned at the beginning of a write operation, the write process generates ripple structures, or distortion, in the recorded magnetic pattern that increase over the duration of the writing cycle. These magnetic distortions are read as noise and will deteriorate the signal-to-noise ratio of the readback. The present invention provides a solution to this and other problems, and offers other advantages over the prior art.

SUMMARY OF THE INVENTION

One embodiment of the invention is a perpendicular recording head for transferring data to a magnetic medium having a recording layer and an underlayer of soft magnetic material. Erasing means erases magnetic effects in the soft magnetic material underlayer. In preferred embodiments, a head includes a first write transducer for perpendicularly writing data into the recording layer, and the erasing means comprises a second write transducer for writing a DC effect longitudinally into the underlayer.

In preferred embodiments, the head has an air bearing surface arranged to confront the magnetic medium and the second write transducer includes first and second permanent magnet legs supported by the head in spaced relation to form a transducing gap. The first and second legs are arranged to generate a magnetic field along the track of the magnetic medium to write a DC magnetic effect longitudinally into the soft magnetic underlayer.

In use, data are perpendicularly written into the recording layer of the medium by the first write transducer, and longitudinal magnetic effects are erased from the soft magnetic underlayer by the second write transducer. As a result, noise recovered by the read transducer is reduced.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
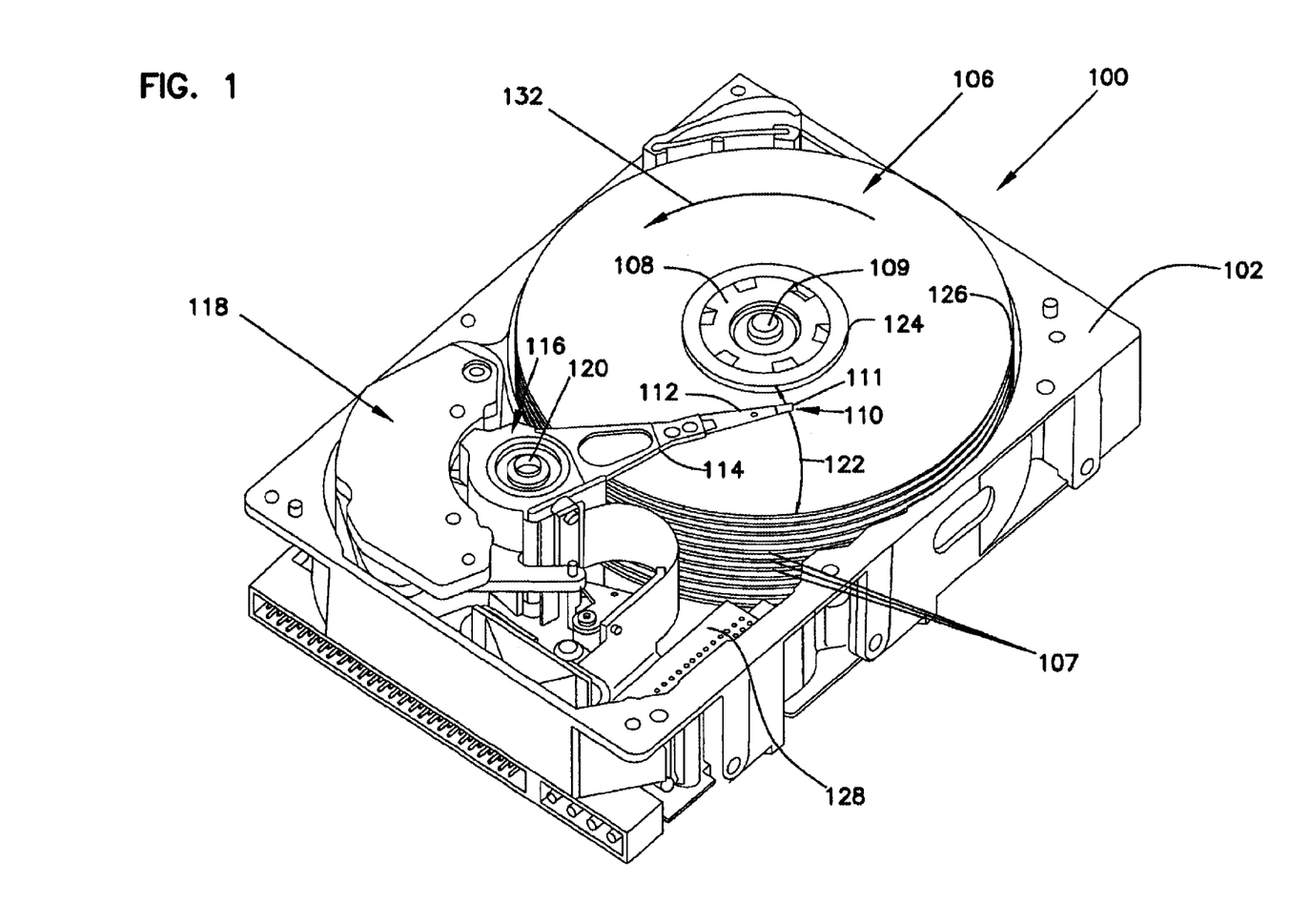
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108 for rotation in the direction of arrow 132. Disc pack 106 includes a plurality of individual discs 107, which are mounted for co-rotation about central axis 109. Each disc surface has an associated slider 110 that is mounted in disc drive 100 for communication with the confronting disc surface. Slider 110 is arranged to fly above the associated disc surface of an individual disc of disc pack 106, and carries a transducing head 111 arranged to write data to, and read data from, concentric tracks on the confronting disc surface. In the example shown in FIG. 1, sliders 110 are supported by suspensions 112 which are in turn attached to track accessing arms 114 of an actuator 116. Actuator 116 is driven by a voice coil motor (VCM) 118 to rotate the actuator, and its attached sliders 110, about a pivot shaft 120. Rotation of actuator 116 moves the heads along an arcuate path 122 to position the heads over a desired data track between a disc inner diameter 124 and a disc outer diameter 126.

Voice coil motor 118 is operated by position signals from servo electronics included on circuit board 128, which in turn are based on error signals generated by heads 111 and position signals from a host computer (not shown). Read and write electronics are also included on circuit board 128 to supply signals to the host computer based on data read from disc pack 106 by the read portions of heads 111, and to supply write signals to the write portions of heads 111 to write data to the discs.

Figure 2:
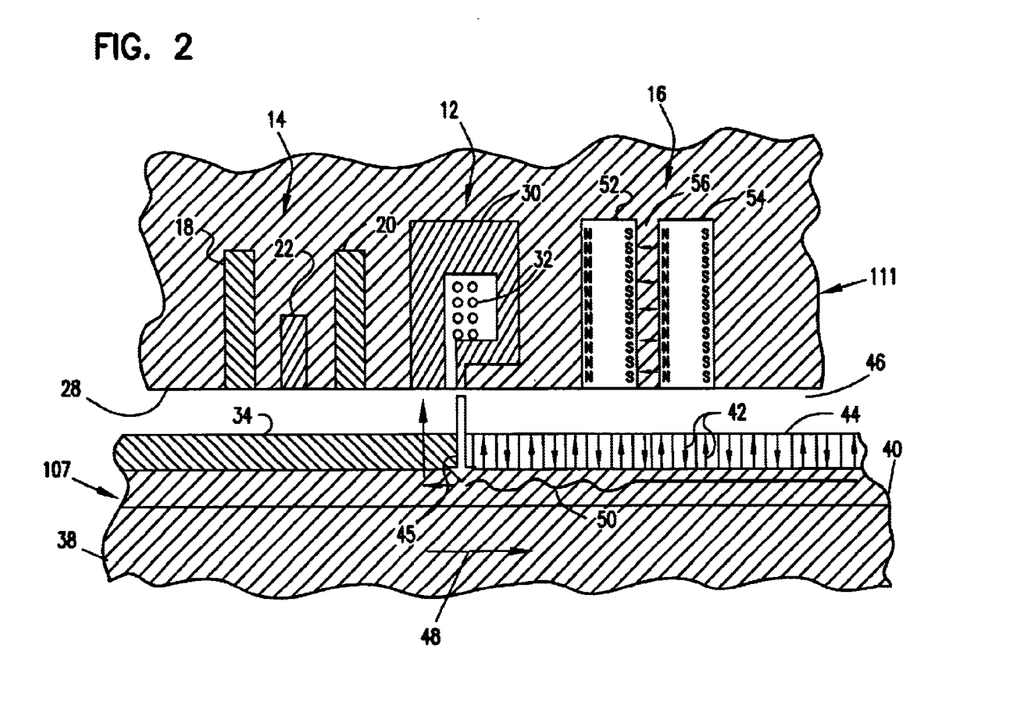
FIGS. 2 and 3 are diagrams illustrating the principles of a transducing head in accordance with an embodiment of the present invention.
Figure 3:
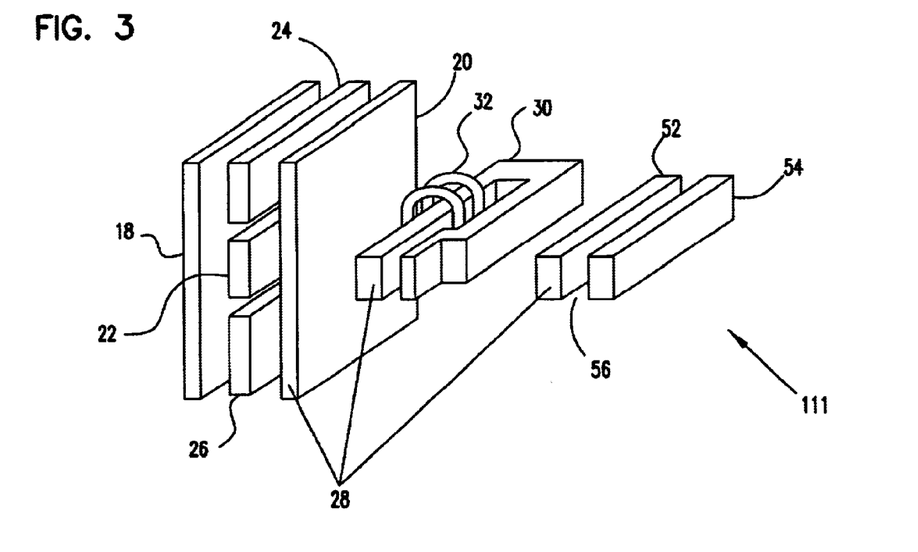

FIGS. 2 and 3 illustrate the principles of a recording head 111 in accordance with an embodiment of the present invention. More particularly, FIG. 2 illustrates head 111 and medium 107 in section along a track on medium 107, and FIG. 3 is a perspective view of the operative elements of head 111, from air bearing surface 28, with support structure removed for sake of clarity. Head 111 includes a perpendicular writer 12, a reader 14 and a DC writer 16. Perpendicular writer 12 and perpendicular reader 14 are of conventional design. Examples of suitable perpendicular readers 14 include current in-plane giant magnetoresistive (GMR) transducers, tunnel giant magnetoresistive transducers, current perpendicular-to-plane giant magnetoresistive transducers and other suitable magnetoresistive and inductive head designs. Typically, the reader includes permanent magnetic shields 18 and 20 that shield the reader element, such as magnetoresistive element 22, from writer 12. Where reader 14 includes a magnetoresistive element, it usually also includes permanent bias magnets 24 and 26 that magnetically biases magnetoresistive element 22 in a manner well known in the art. In either case, reader 14 confronts the recording medium 107 at air bearing surface 28 of the head.

Similarly, perpendicular writer 12 is of conventional design and may be any suitable perpendicular writer, such as an inductive core 30 and coil 32 arranged to induce magnetic flux perpendicularly in recording layer 34 of the recording medium, such as disc 107. Disc 107 includes a substrate 38 supporting a soft magnetic underlayer 40 and hard recording layer 34. As shown particularly in FIG. 2, magnetic dipoles 42 in recording layer 34 are oriented perpendicular to the surface 44 of recording medium 107 so that magnetic flux 45 from writer 12 extends perpendicularly from one leg of C-core 30, across the space 46 between air-bearing surface 28 of head 111 and the surface 44 of recording medium 107, perpendicularly through recording layer 34, longitudinally along soft magnetic underlayer 40, and thence back to the other leg of the C-core 30 perpendicularly through recording layer 34 and space 46. Because the head is moving in the direction of arrow 48 relative to medium 107 due to the movement of medium 107 past the recording head, flux passing through recording layer 34 due to the leading leg of core 30 is overwritten in the opposite direction by the flux extending from the trailing leg of the core.

The a result of perpendicular writing is that magnetic dipoles 42 in recording layer 34 are oriented perpendicularly to the surface 44 of the medium as illustrated in FIG. 2. However, during recording, flux passes longitudinally through the soft magnetic underlayer 40, thereby recording magnetic distortion 50 in soft magnetic underlayer 40. Distortion 50 is read as noise by reader 14, which may generate spurious signals due to the noise that may be erroneously interpreted as data. Additionally, noise signals generated from distortion 50 diminishes the signal-to-noise ratio of the recovered data, increasing the risk of error.

In accordance with the present invention, a DC magnetic writer 16 is included in the structure of head 111 trailing writer 12 along the tracks of the medium. In preferred embodiments, writer 16 comprises a pair of permanent magnets 52 and 54 oriented to provide a constant longitudinal magnetic field in a direction parallel to the air bearing surface 28 and magnetic medium 107. Permanent-magnet writer 16 erases any magnetic recording in soft magnetic underlayer 40 by generating a substantially constant, or DC, magnetic field to write a substantially constant, or DC, magnetic effect into underlayer 40. The longitudinal field does not affect the perpendicular recording in hard recording layer 34, but effectively erases the distortion 50 recorded in the soft magnetic layer by perpendicular writer 12. The stray magnetic field from writer 16 should be large enough to erase the soft magnetic underlayer yet small enough to not disturb the written transitions in the recording layer 34. The anisotropy of soft underlayer 40 is significantly smaller than that of recording layer 34. Consequently, a DC magnetic effect is more easily written into the underlayer than into the recording layer. We have found that for a magnetic medium consisting of a 20 nm thick recording layer 34 having a coercivity of 10,000 Oersteds (Oe) on a 20 nm thick permalloy underlayer 40, adequate results occur when writer 16 provides a DC magnetic erase field of at least about 1,000 Oe in underlayer 40 and less than about 5,000 Oe in recording layer 34. The upper limit of the magnetic erase field is dependent on the anisotropy of the recording layer, and the erase field strength may be increased as the anisotropy of the recording layer is increased.

The permanent magnet material used in both magnets 52 and 54 of writer 12 preferably possesses several key properties. To ensure a field strength of several thousand Oersteds in the soft underlayer, a remnant magnetization (Rm) greater than about 500 emu/cm$^3$ is required for a longitudinal spacing between magnet legs 52 and 54 of about 0.03 and 0.3 $\mu$m. To further ensure that the field at the underlayer is both uniform and stable, the material should possess strong uni-axial anisotropy parallel to the growth direction, a large coercivity, greater than about 1,000 Oersteds, to resist reversal from the disc field, and a large "squareness" to minimize the formation of reverse bubble or band domains that can reduce the magnetic field at the underlayer. Finally, the material should be corrosion resistant and compatible with slider processing since it is exposed to the air bearing surface.

We have found these properties can be obtained using existing cobalt-platinum (CoPt) based permanent magnet materials. Remnant magnetization values for these materials are typically between 500 and 900 emu/cm$^3$ and can be tuned by compositional adjustment. Perpendicular anisotropy values are typically greater than 10$^5$ ergs/cm$^3$ due to its uni-axial hexagon crystalline structure. The c-axis of the crystal can be made parallel to the growth direction through the use of proper seed and spacer layers, such as tantalum, tantalum nitride, platinum or palladium. Coercivities in excess of 1,000 Oersteds can be readily achieved through control of the film microstructure via a sputtering process. Unlike permanent magnets of some readers that are set parallel to the air bearing surface in the cross-track direction, the magnetic legs 52 and 54 are parallel to the air bearing surface in the down-track direction. Consequently, the coercivities of the reader bias magnets 24 and 26 and the legs 52 and 54 of writer 16 should be different to allow a two-step setting process so that the magnets of both writer 16 and reader 14 are in the desired orientation. We have found that a coercivity difference of at least about 500 Oersteds is adequate. Moreover, CoPt magnet materials and their derivatives are known to be robust against corrosion over ordinary pH ranges.

FIGS. 4–19 are computer models of an arrow-plot of the in-plane distribution of magnetic moments in soft underlayer 40, as well as the perpendicular, down-track and cross track components of the magnetic moments, under various recording conditions. In each case, the soft underlayer 40 was represented by a 20 nm thick permalloy film. Recording layer 34 consisted of a 20 nm thick layer of perpendicular recording medium having a coercivity of 10,000 Oe. The in-plane grain size is 10 nm×10 nm and transitions were recorded at 320K bits per inch with a permalloy single pole writer. Permanent magnets 52 and 54 generated a constant (DC) magnetic field strength of 5000 Oe in recording layer 34 and 2500 Oe in soft underlayer 40.

Figure 4:
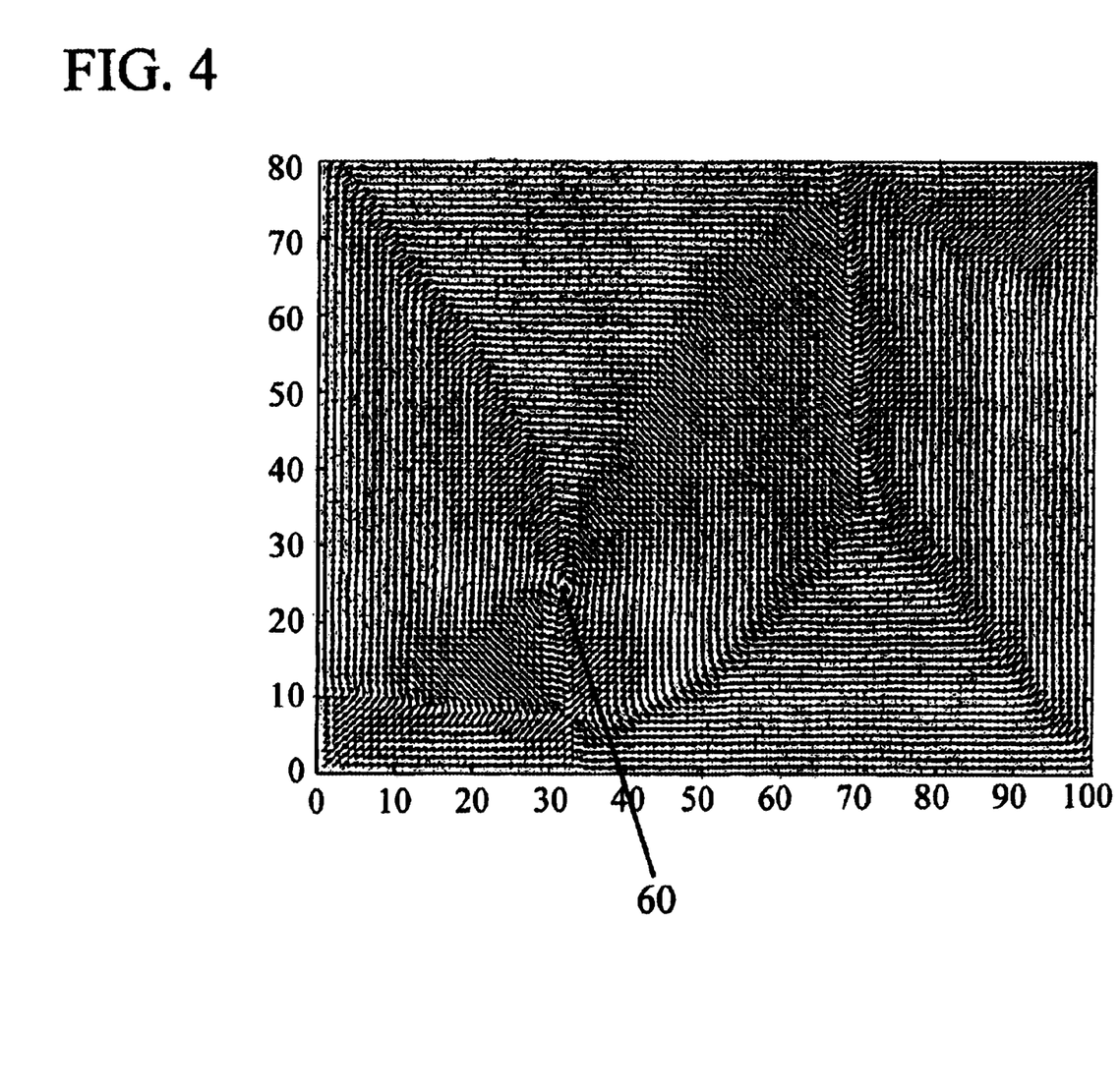
FIGS. 4–19 illustrate computer generated distributions of the in-plane magnetic moment, and the perpendicular, down-track and cross track components, in the soft magnetic underlayer during a variety of recording conditions with and without the present invention.
Figure 5:
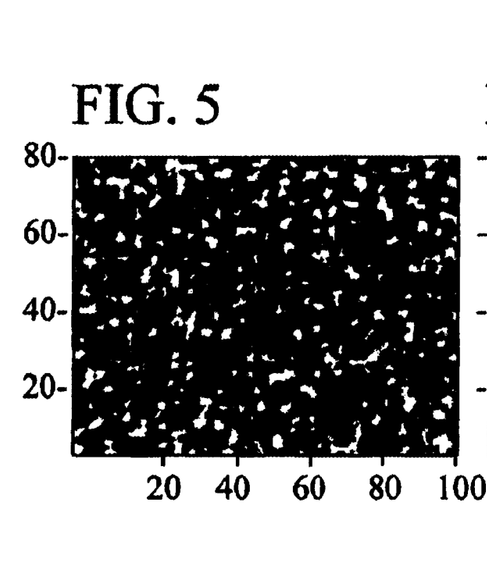
Figure 6:
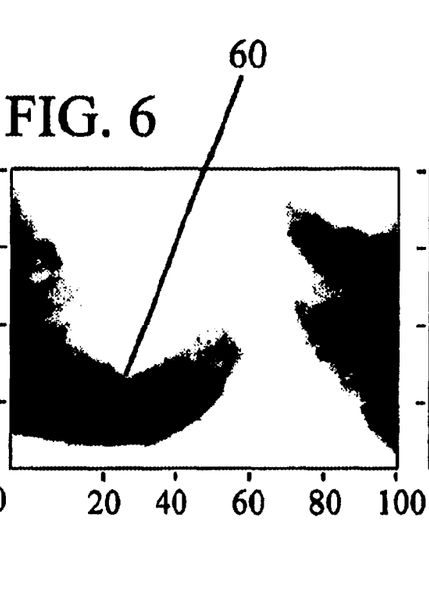
Figure 7:
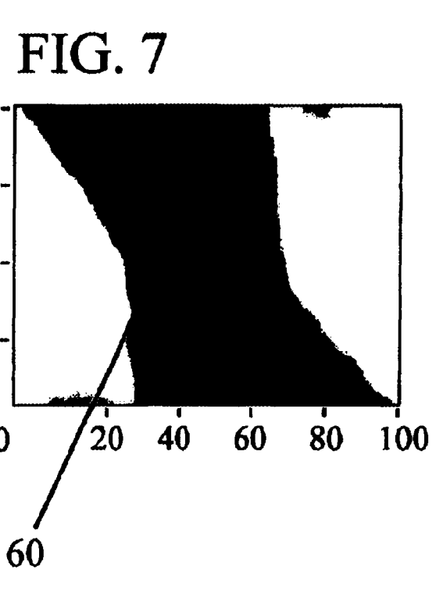
Figure 8:
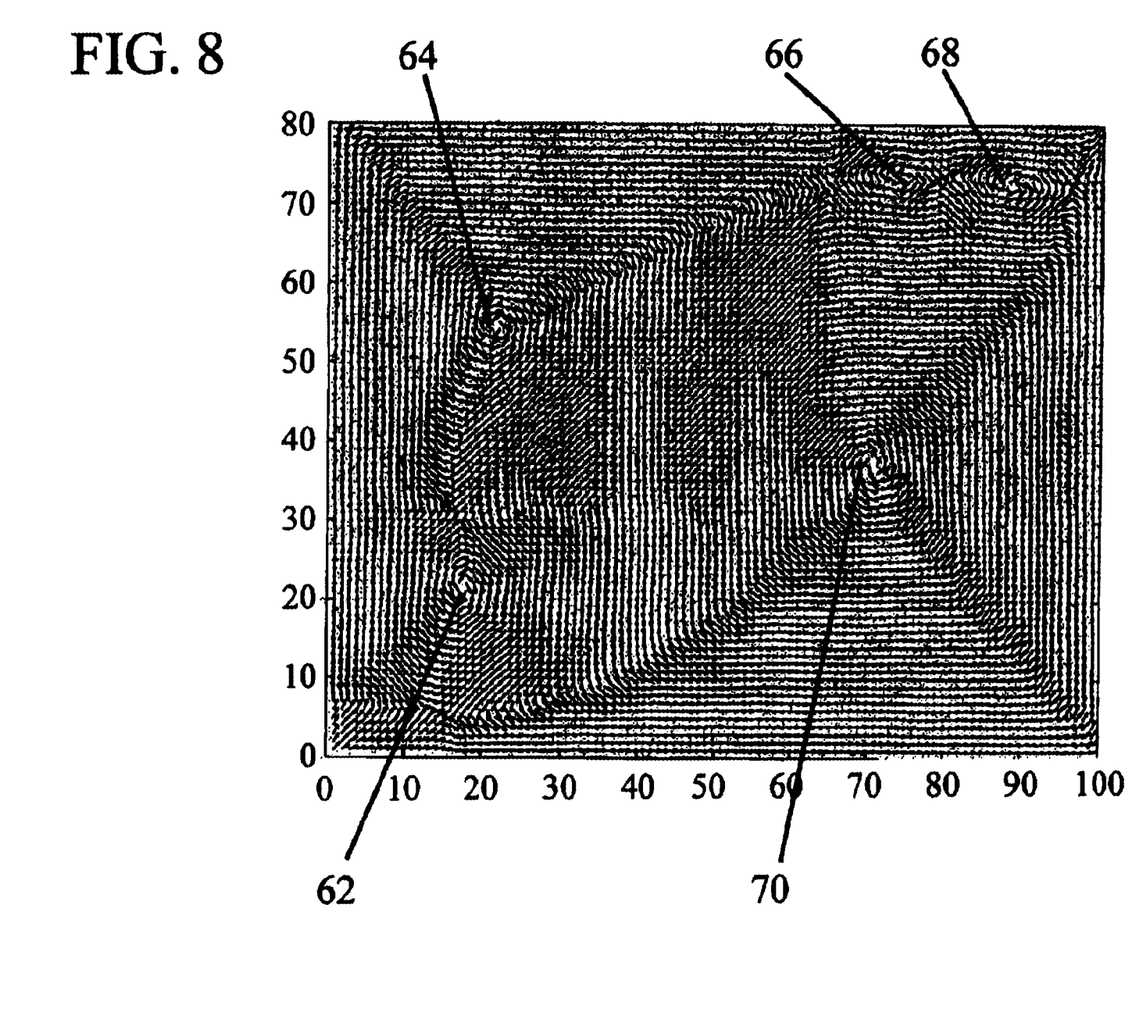
Figure 9:
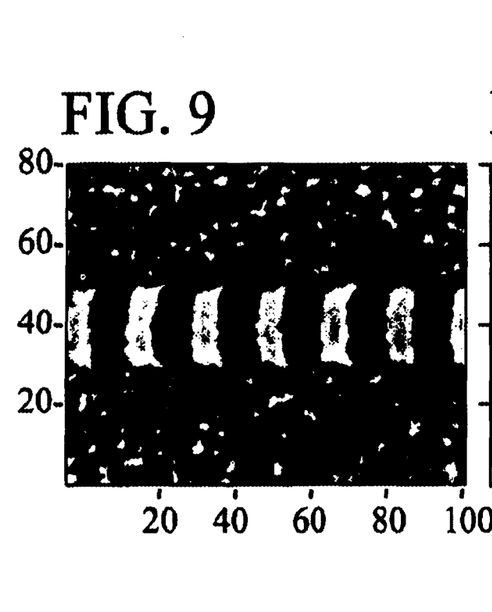
Figure 10:
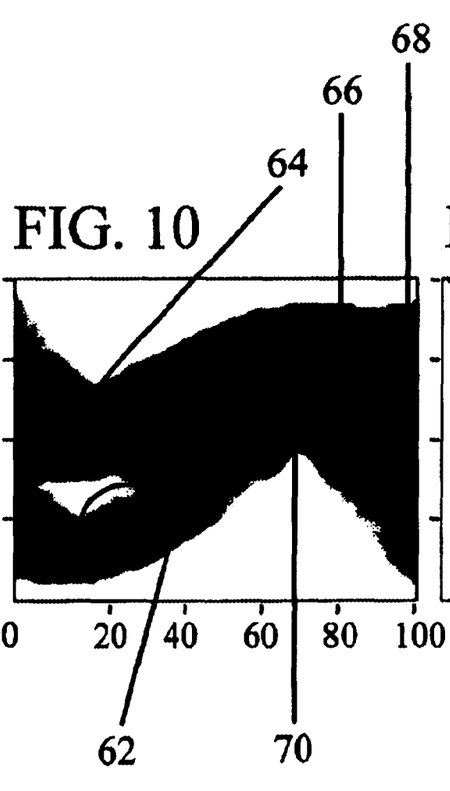
Figure 11:
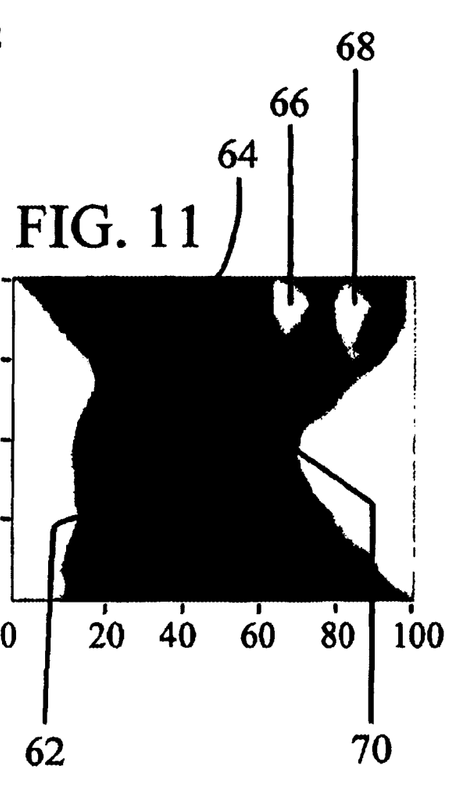
Figure 12:
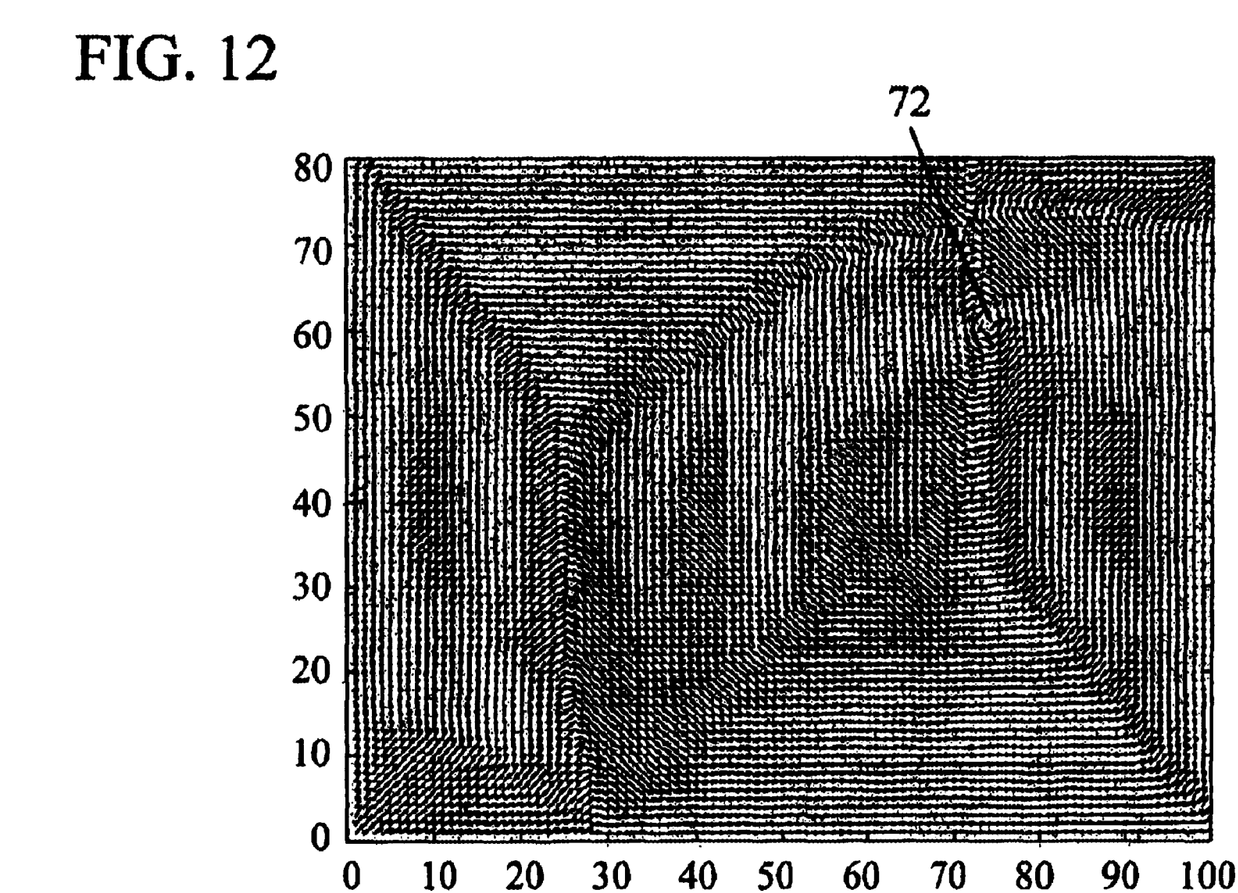
Figure 13:
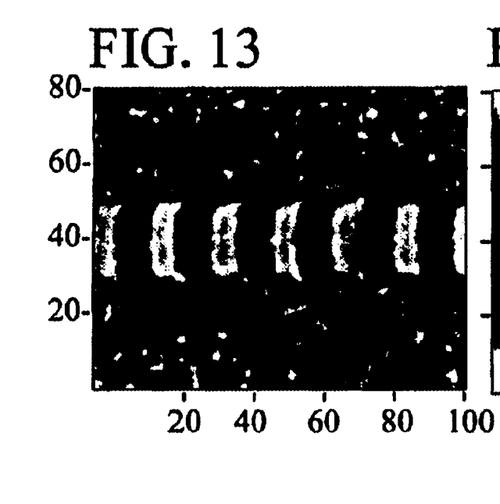
Figure 14:
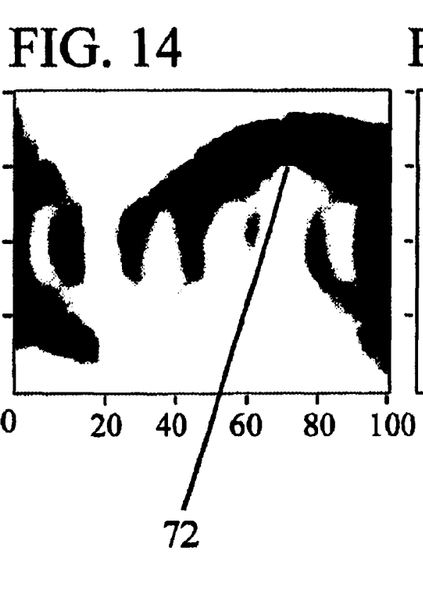
Figure 15:
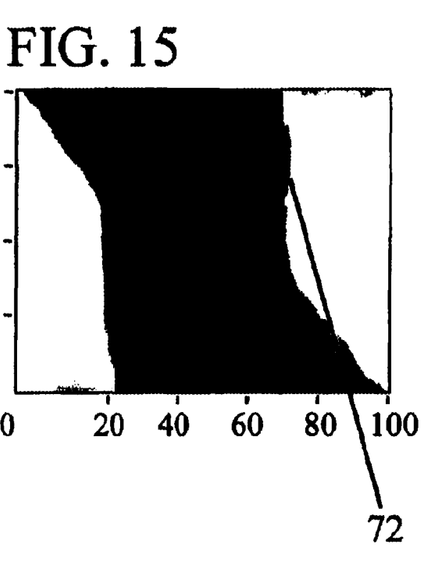
Figure 16:
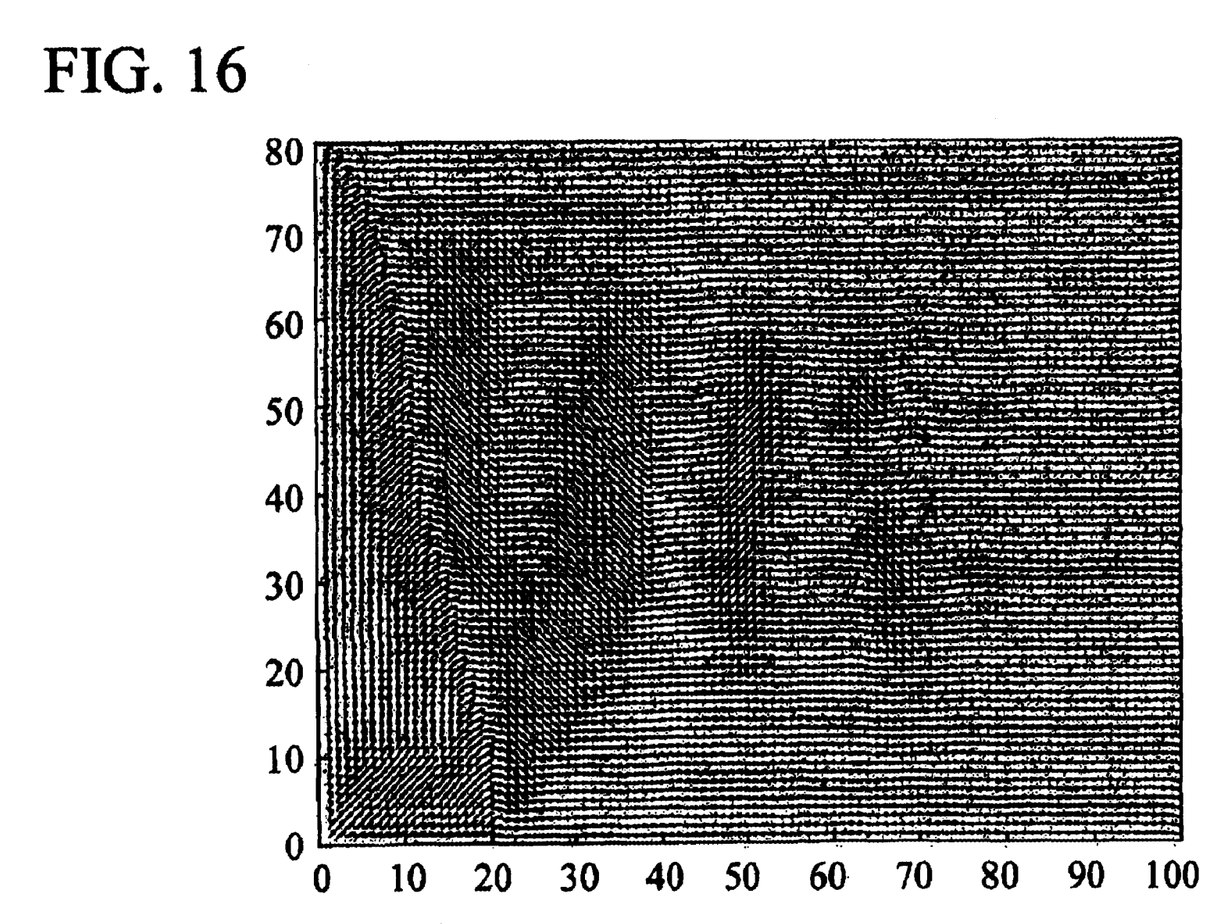
Figure 17:
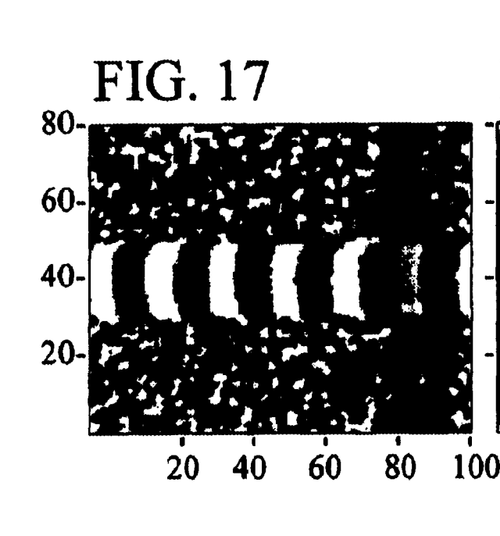
Figure 18:
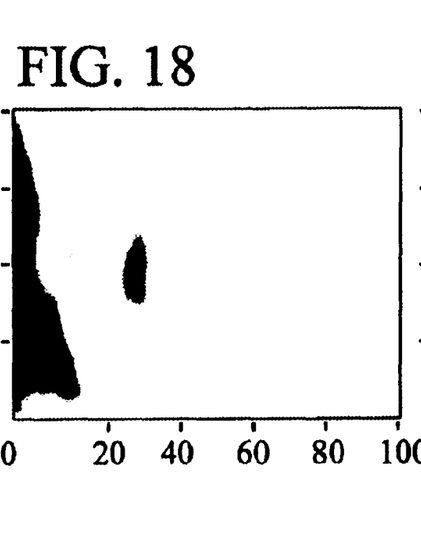
Figure 19:
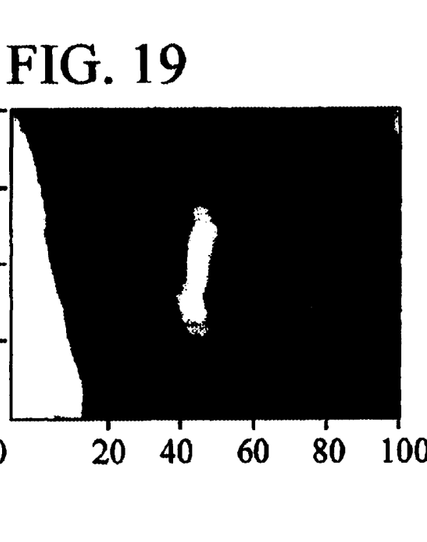

FIG. 4 is a computer model illustrating the in-plane distribution of magnetic moments in soft underlayer 40 during an AC demagnetized state, and FIGS. 5–7 illustrate the perpendicular, down-track and cross track components of the magnetic moments shown in FIG. 3. As shown particularly in FIG. 5, the perpendicular component of the magnetic moments is near zero due to the demagnetized state (absence of data) of recording layer 34. Hence, FIG. 4 illustrates the ideal condition of the soft underlayer 40. (The remnant field shown in FIG. 4, including vortex 60, is the result of shape anisotropy effects in the finite shaped sample of the test.) FIGS. 8–10 illustrate the in-plane distribution of magnetic moments and the perpendicular, down-track and cross track components in soft underlayer 40 during a recorded state of recording layer 34 without application of a permanent magnet field, such as by legs 52 and 54. Hence, FIGS. 8–11 illustrate the magnetic moments in the underlayer due to prior perpendicular recording heads (without an erase head 16 according to the present invention). FIG. 9 illustrates the perpendicular recording pattern resulting from the perpendicular recording in recording layer 34. As shown in FIGS. 8, 10 and 11, the number of vortices 62–70 increases. These vortices are detected by the read head, such as read head 14, and appear as noise in the recovered data signal from the read head.

FIGS. 12–15 illustrate the distribution of in-plane magnetic moments and the perpendicular, down-track and cross track components in soft underlayer 40 during a recorded state of recording layer 34 with application of a permanent magnet field by legs 52 and 54 where the space 56 between the legs is 0.03 $\mu$m. The remnant perpendicular recording pattern is shown in FIG. 13, and FIGS. 12, 14 and 15 show a single vortex 72, similar to the pattern achieved with demagnetization of recording layer 34 shown in FIGS. 4–7. Hence, FIGS. 12–15 demonstrate that the soft magnetic underlayer 40 is nearly free of remnant magnetic fields that may generate noise in the read head upon recovery of perpendicularly-recorded data. FIGS. 16–19 illustrate the distribution of in-plane magnetic moments and the perpendicular, down-track and cross track components in soft underlayer 40 during a recorded state of recording layer 34 with application of a permanent magnet field by legs 52 and 54 where the space 56 between the legs is 0.3 $\mu$m. This version of the erase writer 16 shows significant improvement over the version without an erase head (FIGS. 8–11) and over the embodiment of the invention employing a more narrow space 56 (FIGS. 12–15). As shown in FIGS. 16–19, the principal magnetic interaction is between the recorded pattern and the soft underlayer, without vortices that might generate noise in the recovered read signal.

FIGS. 12–19 demonstrate that the DC overwrite procedure does not induce detrimental effects on the pattern recorded in recording layer 34. Moreover, write-induced vortices are substantially removed so that the magnetic state that existed in underlayer 40 prior to recording is effectively restored. Moreover, a wider gap 56 between magnets 52 and 54 substantially improves the overwrite behavior, removing micromagnetic structure from the remnant magnetic structure in the underlayer. Consequently, the remnant magnetic structure is primarily due only to the interaction between the recorded pattern and the soft underlayer.

Stated another way, an embodiment of the present invention is a data storage apparatus 100 having a magnetic medium 107 that has a recording layer 34 and an underlayer 40 of soft magnetic material. Erasing means 16 erases magnetic effects in soft magnetic material underlayer 40. In some embodiments, a head 111 has a first write transducer 12 for writing data perpendicularly into recording layer 34, and the erasing means comprises a second write transducer 16.

In preferred embodiments, the head includes a structure 111 having an air bearing surface 28 arranged to confront magnetic medium 107 so that the air bearing surface is a predetermined distance defined by space 46 from a surface 44 of magnetic medium 107 when the medium is moved in a predetermined manner relative to the head. The second write transducer comprises first and second permanent magnet legs 52 and 54 supported by the structure 111 in spaced relation 56 to form a transducing gap. The first and second legs 52 and 54 are arranged to generate a magnetic field along a track of magnetic medium 107 when head 111 confronts the magnetic medium. The magnetic field has a strength to write the DC magnetic effect longitudinally into the soft magnetic underlayer 40.

In some embodiments, a read transducer 14 is supported by structure 111 to read data from tracks on medium 107. In some of these embodiments, the read transducer includes a magnetoresistive element and third and fourth permanent bias magnets 24 and 26 supported by structure 111.

In other embodiments of the invention, noise is reduced in read signals recovered by read head 14 from magnetic medium 107 where the data are written perpendicularly into a magnetic recording layer 34 of magnetic medium 107 and the medium includes a soft magnetic underlayer 40. The noise is reduced by longitudinally erasing magnetic effects in underlayer 40, such as with a DC longitudinal writer, after recording the data.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the head while maintaining substantially the same functionality without departing from the scope and spirit of the present invention. Thus, the invention may be embodied on a head trailing a perpendicular writer to erase noise recorded in the soft underlayer by the perpendicular writer. Alternatively, the invention may be embodied as a separate head that erases the recorded noise during a separate noise-erasing operation. Additionally, the details of the structure of the perpendicular writer 12 and of the reader 14 are given by way of example, and not of limitation, and are not limiting on the DC writer of the present invention. While the DC writer 16 has been described as a pair of longitudinally permanent magnets, any arrangement that produces a longitudinal magnetic field for erasing the recorded noise may be employed, such as a permanent magnet C-core, or a single permanent magnet with a magnetic coupler. Alternatively, the DC writer may be a longitudinal inductive head that is operated by a direct current to produce the noise-erasing magnetic field in the soft underlayer. In addition, although the invention is described herein is directed to data recording apparatus, those skilled in the art will appreciate that the teachings of the present invention can be applied to other devices, without departing from the scope and spirit of the invention.

What is claimed is:

1. Data storage apparatus comprising:
   a magnetic medium having a recording layer of hard magnetic material for perpendicularly storing magnetic representations of data and having an underlayer of soft magnetic material;

erasing means for erasing magnetic effects in the soft magnetic material underlayer.

2. The apparatus of claim 1, including a head having:
a first write transducer for perpendicularly writing data into the recording layer, and
the erasing means comprises a second write transducer on the head for writing a DC effect longitudinally into the underlayer.

3. The apparatus of claim 2, wherein the second write transducer is mounted to the head to trail the first write transducer.

4. The apparatus of claim 2, including a structure having an air bearing surface arranged to confront the magnetic medium so that the air bearing surface is a predetermined distance from a surface of the magnetic medium when the medium is moved in a predetermined manner relative to the head, and wherein the second write transducer comprises:
first and second permanent magnet legs supported by the structure in spaced relation to form a transducing gap, the first and second legs being arranged to generate a magnetic field along a track of the magnetic medium when the head confronts the magnetic medium, the magnetic field having a strength to write the DC magnetic effect longitudinally into the soft magnetic underlayer.

5. The apparatus of claim 4, wherein the first and second write transducers are supported by the structure so that the second write transducer trails the first write transducer.

6. The apparatus of claim 4, further including:
a read transducer supported by the structure to read data from tracks on the medium,
a permanent magnetic shield supported by the structure for shielding the read transducer from magnetic fields generated by the first and second write transducers.

7. The apparatus of claim 6, wherein the read transducer includes
a magnetoresistive element for reading data from tracks on the medium, and
third and fourth permanent magnet legs arranged to magnetically bias the magnetoresistive element, the first, second, third and fourth legs each has a coercivity of at least 1000 Oersteds, and the first and second legs each has a coercivity that is different from the coercivity of the third and fourth legs by at least 500 Oersteds.

8. The apparatus of claim 4, wherein the first write transducer comprises:
a magnetic core supported by the structure having fifth and sixth legs terminating at the air bearing surface, the termination of the fifth and sixth legs being in spaced relation along a recording track of the magnetic medium when the head confronts the magnetic medium, and
an electric coil wrapped around the fifth leg for receiving an AC signal representative of data to induce an alternating magnetic field into the medium, which alternating magnetic field extends perpendicular through the recording layer between the underlayer and each of the fifth and sixth legs and longitudinally through the underlayer between regions of the medium confronting the terminations of the fifth and sixth legs.

9. The apparatus of claim 1, including a structure having an air bearing surface arranged to confront the magnetic medium so that an air bearing surface is a predetermined distance from a surface of the magnetic medium when the medium is moved in a predetermined manner relative to the head, and wherein the erasing means comprises:
first and second permanent magnet legs supported by the structure in spaced relation to form a transducing gap, the first and second legs being arranged to generate a magnetic field along a track of the magnetic medium when the structure confronts the magnetic medium, the magnetic field having a strength to write the DC magnetic effect longitudinally into the soft magnetic underlayer.

10. The apparatus of claim 1, including a head having:
a write transducer for perpendicularly writing data into the recording layer, and
the erasing means is arranged on the head to trail the write transducer.

11. In a disc drive having a rotatable magnetic disc having a hard magnetic recording layer and an underlayer of soft magnetic material and a first write transducer arranged to confront a surface of the disc to perpendicularly write data to the magnetic recording layer, the improvement comprising:
a second write transducer for writing a DC magnetic effect longitudinally into the underlayer.

12. The disc drive of claim 11, including a head supporting the first and second write transducers and having an air bearing surface arranged to confront the magnetic medium so that the air bearing surface is a predetermined distance from a surface of the magnetic medium when the medium is moved in a predetermined manner relative to the head, the second write transducer comprises:
first and second permanent magnet legs supported by the structure in spaced relation to form a transducing gap, the first and second legs being arranged to generate a magnetic field along a recording track of the magnetic medium when the head confronts the magnetic medium, the magnetic field having a strength to write the DC magnetic effect longitudinally into the soft magnetic underlayer.

13. The disc drive of claim 12, wherein the second write transducer is mounted to the head to trail the first write transducer.

14. The disc drive of claim 12, wherein the head further includes:
a read transducer to read data from tracks on the medium.

15. The disc drive of claim 14, wherein the read transducer includes:
a magnetoresistive element for reading data from tracks on the magnetic medium, and
third and fourth permanent magnet legs arranged to magnetically bias the magnetoresistive element, the first, second, third and fourth legs each has a coercivity of at least 1000 Oersteds, and the first and second legs each has a coercivity that is different from the coercivity of the third and fourth legs by at least 500 Oersteds.

16. The disc drive of claim 12, wherein the first write transducer comprises:
a magnetic core having fifth and sixth legs terminating at the air bearing surface, the termination of the first and second legs being in spaced relation along a recording track of the magnetic medium when the write head confronts the magnetic medium, and
an electric coil wrapped around the fifth leg for receiving an AC signal representative of data to induce an alternating magnetic field into the medium, which alternating magnetic field extends perpendicularly through the recording layer between the underlayer and each of the fifth and sixth legs and longitudinally through the underlayer between regions of the medium confronting the terminations of the fifth and sixth legs.

17. The disc drive of claim 11, wherein the second write transducer is arranged to trail the first write transducer.

18. In a disc drive having a write head for perpendicularly writing data into a magnetic recording layer along a track of a magnetic medium having a soft magnetic underlayer, a process of reducing noise in read signals recovered by a read head from a magnetic recording of the data, the process of reducing noise comprising steps of:

a) perpendicularly writing data into the recording layer; and b) longitudinally erasing magnetic effects in the underlayer.

19. The process of claim 18, wherein step (b) is performed after step (a).

20. The process of claim 18, wherein step (a) additionally writes a longitudinal varying magnetic effect in the underlayer, and step (b) includes:

applying a constant magnetic field longitudinally in the underlayer to overwrite the longitudinal varying magnetic effect with a longitudinal DC magnetic effect.

* * * * *